Patented Sept. 20, 1938

2,130,654

UNITED STATES PATENT OFFICE 2,130,654

METHOD OF PRODUCING WHIP

Edward P. Sadler, Louisville, Ky.

No Drawing. Application June 23, 1936,
Serial No. 86,893

2 Claims. (Cl. 99—60)

This invention relates to a new and useful method for producing a whip for use in making ice cream and other frozen or chilled foods of a similar nature and while the whip is especially useful in the production of ice cream in mechanical refrigerators, it can be equally advantageous when employed in the manufacture of ice cream by the usual churn methods.

Heretofore, when it has been desired to produce a gelatin desert it has been necessary to dissolve it in lukewarm or boiling water and thereafter to add the solution to evaporated milk which when used as a whip has always been boiled. In order to produce the best results when following this old method, it has been necessary to stir the mixture from time to time while it is being frozen and even under these conditions objectionable flakes of ice have remained in the material when ready for use.

The present invention has for an object the preparation of ice cream or the like from a mixture of gelatin and evaporated milk by means of a new and improved process whereby the bulk of the resultant frozen product is approximately five times as great as that of the liquid mixture from which it is produced.

Another object is to utilize a method which completely eliminates flakes of ice from the frozen product.

A still further object is to provide a method which does not require boiling of the evaporated milk nor the step of dissolving the gelatin prior to its use in the mixture.

Another object is to employ a process of manufacture which speeds production of the frozen product by eliminating the necessity heretofore of dissolving the gelatin, boiling the milk, mixing the ingredients and allowing them to stand long enough to jell, and subsequently mixing the product at intervals during the freezing operation.

In carrying out the method it is essential that a thoroughly chilled bowl or other container be used and that there be employed a mixer or agitator likewise thoroughly chilled. In the bowl is placed a desired quantity of chilled evaporated milk. This should approximate one fifth of the amount of the frozen product to be produced. For example if five ounces of cold evaporated milk are placed in the container, the resultant product will be approximately twenty-five ounces in bulk. While the chilled milk is being rapidly agitated, preferably by a rotary mixer, dry pulverized gelatin is mixed into the milk and absorbs moisture, so as to become jelled. The agitation is continued until the mixture has been beaten into a whip which will remain in the bowl if inverted. The increase in volume is due to the fact that the particles of gelatin after becoming jelled through contact with the liquid, are repeatedly beaten up into smaller particles of various shapes, such as flakes which, because of their irregularity, will not lie close together as would the beads formed by the dissolved gelatin if placed in the mixture. These finely divided minute flakes are scattered throughout the mixture and cannot be detected by taste and can only be found through the use of a strong microscope. In practice it has been found that approximately four-fifths of an ounce of gelatin is required for five ounces of evaporated milk but this is not a fixed proportion. Instead the amount can be varied to meet conditions. It is merely essential that enough gelatin be used to produce a whip having the characteristic above mentioned, namely, the ability to remain in the bowl or other container if inverted. By beating up the undissolved powdered gelatin as before explained the resultant product will not fall but can be transferred readily into a suitable container so as to be frozen within a refrigerator or in an ordinary ice cream freezer. In either case no subsequent agitation will be required and it will be found that the frozen product will be entirely free from ice and will have the smoothness and solidity of a product made entirely from cream by the old methods of manufacture.

It is to be understood of course that after the whip has been produced and before it is frozen it can be suitably flavored and any fruit desired can be added thereto. The whip can also be sweetened to taste, the sugar being added to the milk prior to the addition of the gelatin.

The following is a résumé of the method:

1. Thoroughly chill a bowl or other container.
2. Thoroughly chill an agitator preferably in the form of rotary mixer.
3. Place in the bowl the proper quantity of thoroughly chilled evaporated milk.
4. Add sugar to suit taste and whip for one-half minute.
5. Add a small quantity of dry gelatin and whip the mixture for one minute.
6. Continue adding gelatin and whipping the mixture until the resultant product is stiff enough to remain in the bowl when inverted.
7. Add fruit if desired and then place the product in the refrigerator or freezer to remain until served.

What is claimed is:

1. The method of producing a cold food product the bulk of which is about five times the original bulk of the ingredients of the mixture which includes the step of whipping chilled evaporated milk in a chilled container, adding sugar to the milk while being whipped, adding dry powdered gelatin to the milk thereby to jell by the absorption of moisture and continuing to whip the mixture to break up the jelled particles into small flakes of irregular shapes and sizes, a sufficient amount of gelatin being used to produce a whip of such consistency as to remain in the container when inverted, and then chilling the whip.

2. The method of producing a cold food product the bulk of which is about five times the original bulk of the ingredients of the mixture which includes the step of whipping sweetened chilled evaporated milk in a cold container, subsequently adding to the milk a sufficient amount of dry powdered gelatin to produce a whip of such consistency as to remain in the container when inverted, the powdered material acting to jell by the absorption of moisture from the milk, whipping the cold mixture of milk and gelatin to produce minute irregular flakes of gelatin scattered throughout the mixture and increasing the bulk of the mixture to about five times the original bulk of the ingredients of the mixture, and subsequently chilling the whip.

EDWARD P. SADLER.